United States Patent [19]
Schneeberger et al.

[11] 3,808,444
[45] Apr. 30, 1974

[54] X-RAY CONTRAST DETECTION SYSTEM

[75] Inventors: Robert J. Schneeberger; J. Richard Hansen, both of Pittsburgh, Pa.

[73] Assignee: Westinghouse Electric Corporation, Pittsburgh, Pa.

[22] Filed: Jan. 5, 1973

[21] Appl. No.: 321,403

[52] U.S. Cl.................. 250/492, 250/358, 250/367, 250/460
[51] Int. Cl................................................ G01t 1/00
[58] Field of Search........... 250/358, 359, 460, 321, 250/363, 367, 492

[56] References Cited
UNITED STATES PATENTS

| | | | |
|---|---|---|---|
| 3,188,471 | 6/1965 | Hansen et al....................... | 250/308 |
| 3,050,626 | 8/1962 | Dukes et al......................... | 250/358 |
| 3,508,055 | 4/1970 | Wright et al........................ | 250/358 |
| 2,730,566 | 1/1956 | Bartow et al. ..................... | 250/363 |
| 3,255,352 | 6/1966 | Johnston............................. | 250/303 |

*Primary Examiner*—Archie R. Borchelt
*Assistant Examiner*—Harold A. Dixon
*Attorney, Agent, or Firm*—M. P. Lynch

[57] ABSTRACT

The invention relates to a technique for monitoring objects such as parcels or luggage for the presence of a predetermined class of objects, such as guns and bullets, on the basis of contrast detection of transmitted high energy X-rays. An object to be analyzed is subjected to high energy x-ray in a range of 200–400KeV and a plurality of detectors are utilized to monitor the variation of transmission of various portions of the object. Signals developed by the detectors indicative of the x-ray transmission characteristics of the various portions of the object are applied to signal processing circuitry which is adjusted to generate an output signal if any of the detectors produce a signal of a value indicative of a gun or bullet. In the absence of a gun or bullet substantially all high energy x-ray is transmitted through the object and detected by the detectors thus resulting in relatively high signal output from the respective detectors. If, however, a gun or bullet is present within the object, a substantial portion of the high energy x-ray radiation will be absorbed by the gun or bullet thus resulting in a relatively low level signal output from the detectors monitoring that portion of the object within which the gun is located.

5 Claims, 12 Drawing Figures

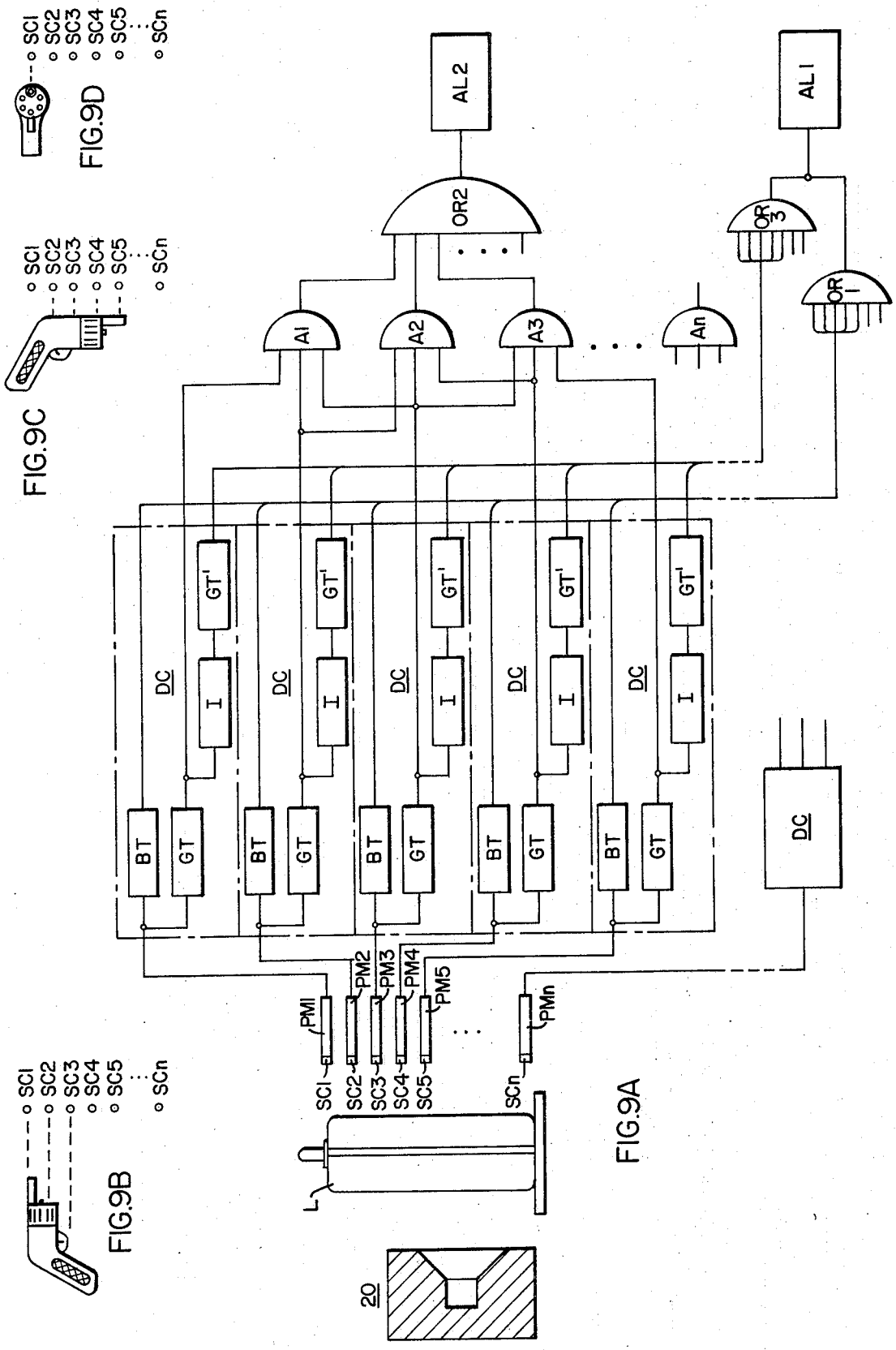

X-RAY CONTRAST DETECTION SYSTEM

BACKGROUND OF THE INVENTION

Prior art monitoring stations utilizing x-ray contrast techniques typically employ the use of a phosphor screen or a phosphor screen in conjunction with a television picture tube to view directly an object and rely on the decision of a human operator to determine the content of the object. The prior art does not disclose a completely automated system for electronically determining the presence of a predetermined class of objects such as a gun by simultaneously monitoring the x-ray transmission characteristic of a plurality of discrete portions of an object.

SUMMARY OF THE INVENTION

The invention is disclosed herein with reference to an embodiment utilizing a collimated beam of x-ray having a narrow horizontal width and a vertical dimension sufficient to irradiate the vertical dimension an object of interest. Aligned with the vertical x-ray beam and displaced from the source of x-ray energy by a distance sufficient to accommodate an object therebetween is a vertical array of a plurality of radiation detectors for monitoring the x-ray transmission characteristic of that portion of the object within its view. The object is moved in a horizontal direction between the x-ray source and the radiation detectors to assure monitoring of the total object.

The radiation detectors are typically represented as a crystal converter (X-ray to light) in combination with a photomultiplier tube. Each crystal in combination with a photomultiplier tube produces an output signal indicative of the x-ray transmission characteristic of the portion of the object between the source and the crystal. The output signal produced by each crystal-photomultiplier combination is compared to a reference or threshold signal representative of a particular class of article for which a detection indication is desired. The presence of a signal from any crystal satisfying the transmission characteristics of the article of interest results in the generation of a detection indication. Of particular interest is the application of the invention for detection of bullets and guns, loaded or unloaded, as a system for screening objects for the presence of concealed weapons. In this application the presence of a lead bullet which absorbs a substantial amount of the x-ray energy in contrast to other materials likely to be found in a parcel, handbag or luggage results in an output signal from the crystal monitoring that portion of the objects within which the bullet is located which is indicative of a very low transmission characteristic. All other crystals not viewing bullets will produce an output signal indicative of relatively high transmission characteristics.

In the application of the x-ray contrast detection system for monitoring relatively thick or dense objects such as guns, loaded or unloaded, x-ray energy in a range of 200–400 KeV has provided the most desirable operating results.

Furthermore, while numerous state-of-the-art techniques can be utilized to provide the necessary high energy x-ray, i.e., between 200 and 400 KeV, including an x-ray machine and sealed radioactive isotope sources including that of radium 226 and barium 133, the isotope sources are preferred over the x-ray machine.

In yet another embodiment the plurality of detectors can be replaced by a single strip detector and a flying spot scanner which sequentially subjects discrete portions of the strip detector to radiant energy. This embodiment does not however provide simultaneous viewing of the vertical dimension of an object.

DESCRIPTION OF THE DRAWING

The invention will become more readily apparent from the following exemplary description in connection with the accompanying drawing;

FIGS. 9A–9B are schematic illustrations of signal processing circuitry for the embodiment of FIG. 1.

DESCRIPTION OF THE PREFERRED EMBODIMENT

Figure 1:
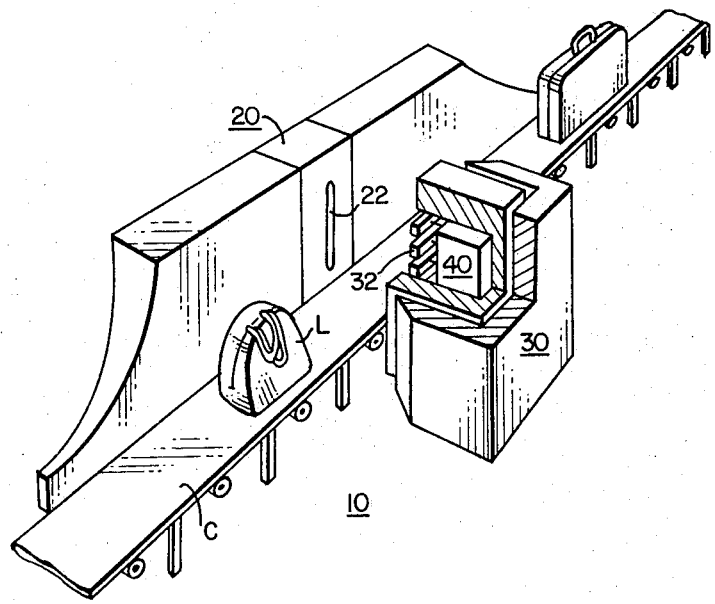
FIG. 1 is a pictorial representation of a preferred embodiment of the invention.

There is illustrated in FIG. 1 a pictorial representation of a parcel monitoring station 10 wherein a conveyor system C passes objects such as luggage between an x-ray radiation source 20 and a radiation detection unit 30. An elongated vertical aperture 22 in the radiation source 20 subjects an object L inserted between the radiation source 20 and the radiation detector unit 30 to a collimated beam of x-ray energy corresponding to the configuration of the aperture 22. The radiation detector unit 30 includes a vertical array of radiation detectors 32 positioned to monitor the x-ray transmission characteristics of the object L corresponding to that portion of the object L viewed by the respective radiation detector as the object L is moved past the radiation detector unit 30. Each of the radiation detectors 32 transmits a signal indicative of the x-ray transmission characteristics of the corresponding portion of the object L to the signal processing circuit 40. The signal processing circuit 40 evaluates the output signals of the respective radiation detectors 32 to determine if the object L contains an article within a predetermined class. In the application of the detection station 10 for monitoring objects for the presence of concealed guns, loaded or unloaded, the signal processing circuit 40 is set to respond to output signals from the radiation detectors 32 indicative of x-ray transmission characteristics of guns or ammunition.

Figure 2:
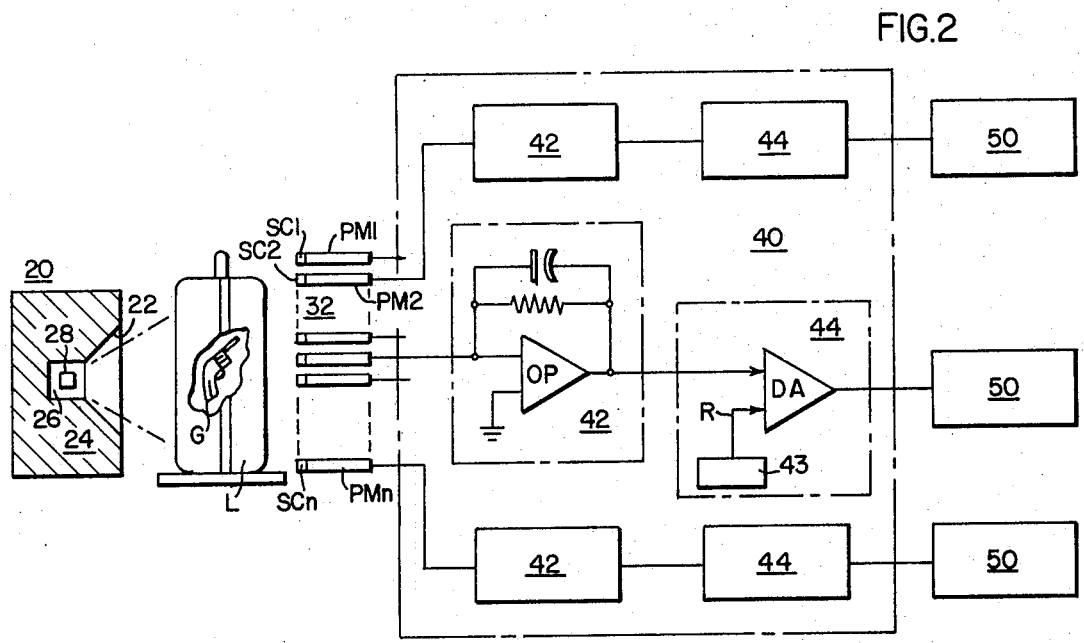
FIG. 2 is a schematic illustration of the embodiment of FIG. 1.

Referring to FIG. 2 there is illustrated schematically the embodiment of the invention of FIG. 1. The radiation source 20 is depicted as being comprised of a lead containment member 24 having a recess 26 therein for accommodating the x-ray source 28 at a location opposite to the opening of aperture 22. The containment member 24 is typically a lead cylinder having the necessary slit aperture 22 for providing a collimated vertical beam of x-ray energy for irradiating the object L while providing adequate shielding of the remaining surrounding environment.

Contrast degradation due to scattering is kept to a minimum by collimating the x-ray energy into a narrow fan beam through the properly shaped slit 22 so that only the area coinciding with the shape of the array of detectors is irradiated. Vertically aligned with the aperture 22 for viewing the radiation transmitted by the object L is the vertical array of radiation detectors 32 each comprised of a scintillation crystal SC and an associated photomultiplier tube PM. Suitable scintillation crystals for converting the x-ray radiation into visible light include conventional sodium iodide and cesium iodide scintillation crystals. The vertical array of radiation detectors is typically comprised of a vertical lineal array of a number of radiation detectors sufficient to view the entire object to be monitored with the desired spatial resolution. In the application of the system for monitoring hand luggage carried by airline passengers a typical implementation of the array of radiation detectors would include a closely spaced vertical lineal array of radiation detectors incorporating scintillation crystals approximately 0.4 inch in diameter. The horizontal scanning of the luggage is provided by the movement of the conveyor.

Figure 3:
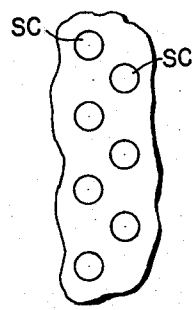
FIG. 3 is an illustration of an alternate array of crystal detectors for the embodiment of FIG. 1.

FIG. 3 illustrates an alternate vertical array of radiation detectors comprised of a first and second vertical lineal array positioned in a staggered manner. The array of FIG. 3 assures complete screening of the entire object L by eliminating the effect of the dead space between adjacent radiation detectors of a single lineal vertical array. If the object to be monitored is stationary then an X-Y array of radiation detectors would replace the vertical array and the radiation source modified to expose the entire object.

The photomultiplier tube PM associated with each of the scintillation crystals SC effectively amplifies the light signal developed by the scintillation crystal in response to impinging x-ray radiation. This radiation is of such intensity (activity) as to allow "pile up" of individual pulses, thus creating a d-c signal on which is superimposed an ac signal due to the random emission of the x-ray photons. DC coupled to the output of each of the photomultiplier tubes PM is a current to voltage converter circuit 42, herein represented as an operational amplifier OP connected for this operating mode. The AC band limit is established by the parallel combination of resistor RF and capacitor CF. The output of each current to voltage converter 42 is dc coupled to a comparator circuit 44 including a differential amplifier DA which functions to compare the output signal to a reference threshold signal R from reference signal source 43. The magnitude of the threshold signal is established to represent the x-ray transmission characteristic of a device of particular interest. In the application of the system 10 for monitoring the presence of a concealed gun, be it loaded or unloaded, the magnitude of the threshold signal R is such as to correspond to the anticipated transmission characteristic of a gun. If the input signal supplied to the comparator circuit 44 from the current to voltage converter circuit 42 satisfies a predetermined relationship with the threshold reference signal R thus indicating the presence of an article of interest within the object L, the comparator circuit 44 transmits a signal to activate detection alarm circuit 50. In the application for monitoring for the presence of guns, the threshold signal R is of a relatively low magnitude in asmuch as the presence of a gun between the source 28 and one or more of the radiation detectors 32 will result in a significant absorption of the radiation energy by the gun and thus a relatively low level of radiation activity contacting the scintillation crystal SC of the radiation detectors viewing the gun G. Thus, the output signal generated by the radiation detectors 32 viewing the gun will be relatively low while the output signals of the radiation detectors 32 not viewing the gun will be substantially higher. The threshold reference signal is established such that an output signal from a radiation detector 32 which is equal to or less than the threshold signal R will result in activation of the corresponding detection alarm circuit 50 whereas an output signal from the radiation detectors 32 which is greater than the threshold reference R will not result in activation of the corresponding detection alarm circuit 50. The activation of one or more of detection alarm circuits 50 indicates the presence of a device of a predetermined class as defined by the threshold reference signal R.

Figure 4:
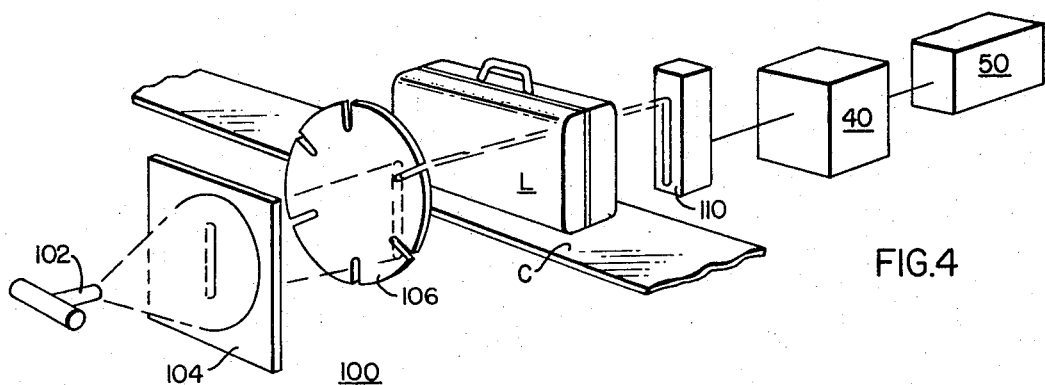
FIG. 4 is a schematic illustration of an alternate embodiment of the invention of FIG. 1.

Another implementation of the parcel monitoring station is schematically illustrated in FIG. 4. The radiation source and plurality of discrete detectors of FIG. 1 are replaced by a flying spot scanner 100 comprised of an x-ray tube 102, a slit collimator 104 and a rotating collimation disc 106, and a single, continuous vertical radiation detector strip 110. The vertical scanning beam produced by the flying spot scanner 100 functions to sequentially irradiate discrete portions of the detector strip 110. The detector strip 110 produces an output signal indicative of the radiation energy transmitted by the luggage L to a discrete portion of the detector strip. This embodiment lacks the capability of simultaneously producing output signals representing the radiation transmission characteristic of the entire vertical dimension of the luggage L.

Because the array of discrete detectors of FIG. 1 makes simultaneous use of the radiation contained in the solid angle subtended by the scan of the areas of each detector, it is suitable for use with the limited radiation intensity obtainable from a practical radioactive source. For carry-on baggage whose vertical dimension is limited to 13 inches, an array of approximately 40 individual detectors is required to provide the spatial resolution necessary to detect guns by contrast alone. Preliminary considerations indicate that a significant cost advantage could be realized by using the combination of an array of discrete detectors with a radium source as compared to the combination of a flying spot scanner and a single strip detector. This comes about because of the relatively high cost and non-portability of generally available constant potential x-ray generating equipment which operates at 150 kV or greater.

The scintillation crystal SC preferably exhibits the characteristics of high density, high atomic number, high photoelectron yield and high light transparency. The high density characteristic assures detection of substantially all gamma rays while the high atomic number produces a high probability of interaction between the scintillation crystal and the gamma rays. The high photon yield capability as well as the light transparency requirements assure generation and transmission of a significant amount of light energy from the scintillation crystal SC to the photomultiplier tube and the generation of a relatively high output signal by the photomultiplier tube PM. An alternate implementation of the radiation detector 32 can be achieved through the substitution of a PIN (positive-intrinsic-negative) diode for the photomultiplier tube. The PIN diode is internally coupled with an operational amplifier to supply a dc voltage signal to the comparator circuit 44.

It has been determined experimentally that the majority of articles found in luggage are made of materials having path lengths such that their x-ray transmission ranges from moderate to almost complete in the 225–350 KeV energy range. Thus, utilization of an x-ray radiation source 28 producing x-ray energy in the range between 200 and 400 KeV will result in significantly high output signals from the radiation detectors 32 which view typical articles contained in luggage and baggage. In contrast, however, a material such as lead as represented by bullets contained in a gun is almost completely opaque at x-ray energies between 200 and 400 KeV even for the relatively short path lengths encountered with a .22 caliber bullet. Since it is unlikely that a concentration of lead to the degree found in a bullet would exist in any other common object, the contrast in x-ray transmission characteristics between a bullet and conventional articles found in luggage provides a reliable basis for detecting a loaded gun. If, for example, the diameter of the scintillation crystal SC is made smaller than the dimensions of a bullet or a concentration of bullets such as would be found in the cylinder or magazine of a gun, the absence of a significant signal from any one or more of the radiation detectors 32 would indicate with a high degree of probability that a loaded gun was passing between the x-ray source 28 and the array of radiation detectors 32.

Off the shelf x-ray tube units can generate relatively large intensities of radiation. Cadmium sulfide detectors or gas ionization type detectors, which are characteristically medium-sensitivity low cost devices, would be suitable for use with x-ray tube units. While the geometry of these detectors would lend themselves very well to the vertical lineal array described above, the combination of these detectors with off the shelf x-ray tube units represent a relatively expensive system and further because of the detector intensity requirements poses a potential problem resulting from darkening of undeveloped photographic film present within the object L. Radioisotope sources such as radium-226 or barium-133 represent a relatively inexpensive source of strong x-ray and gamma ray emissions in the desired range of 200 to 400 KeV. A low maintenance requirement for a radium source coupled with the fact that the combination of the radio-isotope source and scintillation type detector eliminates the potential problem of exposing undeveloped film, makes such a combination preferable.

Figure 5:
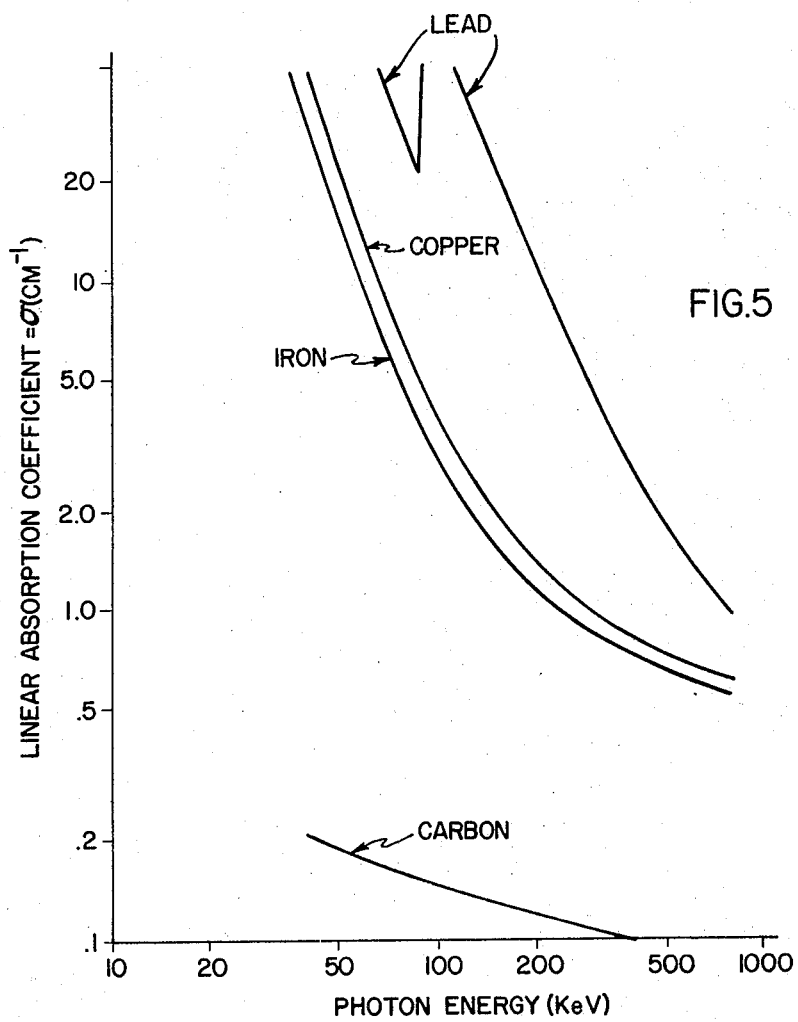
FIGS. 5–8 are graphical illustrations of the operational characteristics of the embodiment of FIG. 1.

The transmission T of monochromatic x-rays through materials is defined as $$T = \exp(-\mu p x) = \exp(-\sigma x),$$

where $\mu$ is the mass absorption coefficient and $\sigma$ is the density of the material. The product $\mu p = \sigma$, which is the linear absorption coefficient, is plotted against energy for the materials of interest as shown in FIG. 5. In the energy region of interest (200–400 KeV) the linear absorption coefficients for iron and copper are so nearly equal that subsequent calculations are based on a mean curve. The normally-listed densities of the metals are used in computing their linear absorption coefficients. For carbon, a density of unity is used. From the values of $\sigma$ at 250 KeV the transmission as a function of path length for the materials are plotted in FIG. 6.

Figure 7:
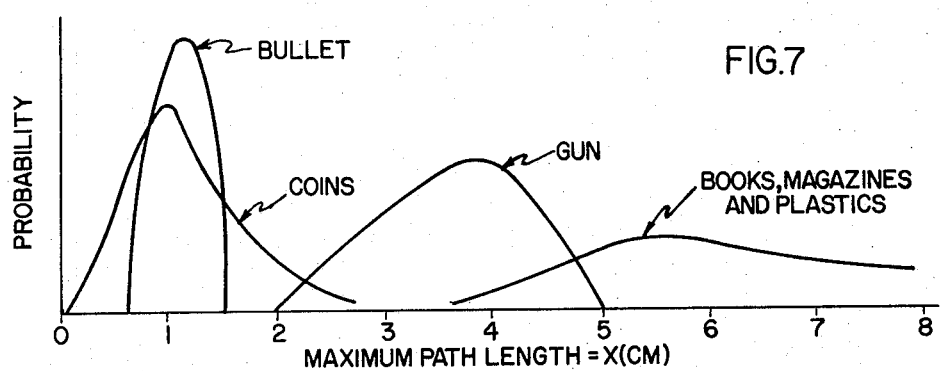

Since discrimination is to be based solely on the relative transmissions of the various articles, one must consider the material of the objects as well as the probability distribution of maximum path length through the objects in the direction of the collimated radiation. From size, shape and orientation considerations, distribution curves can be inferred as illustrated in FIG. 7. The rationale used to generate the curves for each class of objects is outlined below.

BULLET

Since a 22 caliber bullet, for example, cannot have a path length less than its diameter (~ 0.6 cm) or greater than its length (~ 1.5 cm) the probability curve goes abruptly to zero at each extreme with a maximum approximately midway between.

GUN

From actual measurements of a Smith and Wesson Chief 38 Special (stainless, five-cartridge revolver) the maximum path length normal to a broadside view is ~ 2 cm. Any other orientation increases it so that ~ 5 cm is reached parallel to the axis of the barrel. Abrupt approaches to zero at each extreme with a maximum displaced towards to 5 cm limit characterizes this distribution. The displacement of the maximum is due to the slowly changing cosin function in the region of small to moderate path angles with respect to the barrel axis.

COINS

When confined, coins tend to cluster into an "article" of about 1 cm dimension. The distribution goes to zero, of course, for complete absence (zero dimension), but extends beyond 3 cm for unusual confinements such as a roll of pennies.

Non-Metallic Objects

Books and magazines can exhibit a thickness, approaching the maximum permissible width of carry-on baggage. The distribution curve is characterized by a high degree of asymmetry with a very long tail on the long path-length side.

Figure 6:
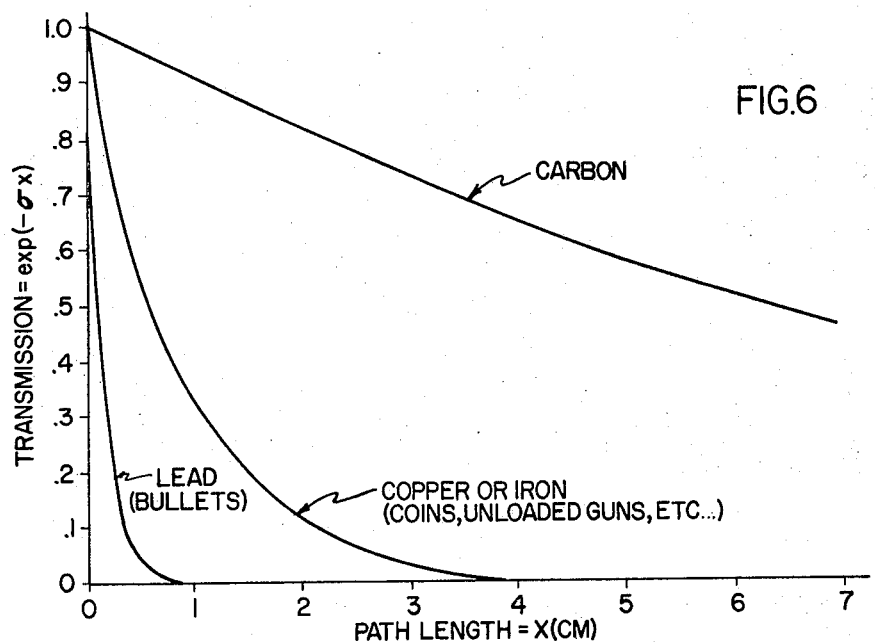
Figure 8:
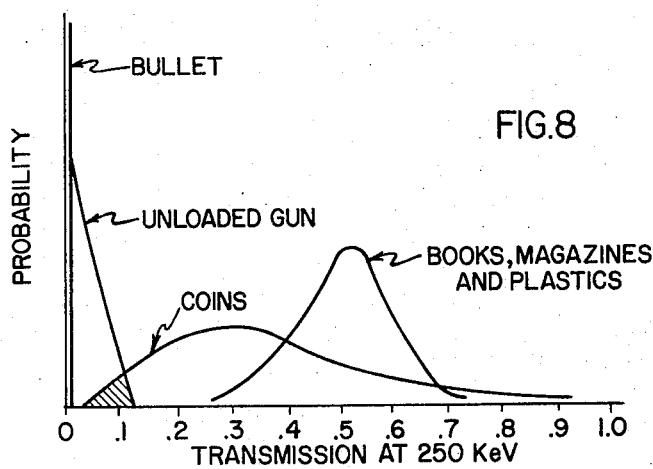

FIG. 8, which is derived from FIGS. 6 and 7, shows the probability of a given transmission for each of the objects indicated. The distribution curve for the bullet is so narrow on the transmission scale that it is shown as a vertical line completely separated from the distribution curve of the coins. In a practical device, however, some scattered radiation will enter the detectors so that the bullets would appear to have a small amount of transmission (probably < .05) so that a very small overlap might occur with the tail of the coins curve. Remembering that the signal outputs of the radiation detectors 32 are direct measures of the radiation transmissions, a reduction in output of any one detector below a threshold setting, i.e., .05, during the passage of a bag would indicate the presence of a bullet with a nearly 100 percent detection probability and with a false alarm probability near zero, provided each detector in the array has dimensions which are equal to or less than one-half of the dimensions of a bullet. If cost per detector is a significant factor, one could trade a compromise in performance for larger and therefore fewer detectors. Once a would-be hijacker decided to put a loaded gun in his carry-on bag, it is unlikely that he would have put much less than the full complement of cartridges in the cylinder or magazine of the weapon.

Under this condition, the dimensions of each detector could be significantly larger (one-half the dimensions of the cylinder or magazine) without compromising system performance.

The small overlap (cross-hatched area) between the gun and the coins distribution curve indicates a nearly 100 percent probability of detecting an unloaded gun with a fairly small false alarm probability for a threshold setting in the neighborhood of .1. Since a gun could be loaded at a later time, the capability of detecting an unloaded gun is valuable. The problem of maximum detector size is significantly alleviated for this situation because the cross-sectional areas of path lengths through thick portions of a gun are much larger than those of individual bullets.

As pointed out, the above analysis is based on 250 KeV monochromatic x-rays. Lower energies crowd the curves of FIG. 8 to the left, while larger energies spread them to the right. From inspection of curves calculated for several energies in the range of 200 to 400 KeV, the degree of discrimination based on an optimum threshold setting appears to change rather slowly. This is fortunate because most x-ray sources have broad-band spectral energy characteristics.

While the embodiment of the invention illustrated in FIG. 1 provides adequate identification of unloaded guns and bullets on the basis of contrast detection of transmitted X-ray energy, there is illustrated schematically in FIG. 9A an embodiment of circuitry for providing additional object discrimination. As is apparent from the information provided by the graphs of FIGS. 5–8, objects such as that represented by a cluster of coins can, under the proper condition, produce a false detection if the threshold level is set to provide detection of a small unloaded gun positioned to expose minimum area to the detectors 32. The discriminating circuitry DC illustrated in FIG. 9A associated with each radiation detector channel provides for reduction in false alarms resulting from alarm actuation in response to objects other than guns and bullets. Inasmuch as the discriminating circuitry DC associated with each radiation detector channel is identical the following description will be limited to the discriminating circuitry DC associated with the first channel consisting of scintillation crystal SC1 and photomultiplier tube PM1. Each of the discriminating circuits DC includes a bullet threshold circuit BT, a first gun threshold circuit GT, an integrator circuit I and a second gun threshold circuit GT'. The threshold circuits BT, GT and GT' are comparable to the threshold detector circuit 44 of FIG. 2 and thus further description of the threshold circuit is not considered necessary. The output signals from the photomultiplier tube PM1 which corresponds to the X-ray transmission characteristic of that portion of luggage L directly viewed by the scintillation crystal SC1 is applied as an input signal in both the bullet threshold circuit BT and the gun threshold circuit GT. In the event the output signal from the photomultiplier PM1 exceeds a reference signal indicative of the transmission characteristic of a bullet, the bullet threshold detector circuit BT transmits an output signal through the OR gate OR1 to activate alarm circuit AL1. Additional inputs to the OR gate OR1 are provided for the output signals developed by the bullet threshold circuits of the discriminating circuits associated with the additional radiation channels. The presence of an output signal indicative of a bullet from any of the radiation channels will result in activation of alarm circuit AL1.

The threshold level indicative of an unloaded gun in the orientation of FIG. 9D may not be distinguishable from that of other objects such as a cluster of coins, thus additional characteristics of the object are required to provide acceptable discrimination. Inasmuch as most guns exhibit dimensions which are greater than objects of similar radiation transmission characteristics typically found in luggage, the actuation of alarm circuit AL2 indicative of the presence of a gun would occur only when a gun detection signal is transmitted by a number of adjacent gun threshold circuits GT corresponding to the dimension of a gun.

There is illustrated in FIGS. 9B, 9C and 9D various orientations of a gun G as it enters the field of view of the lineal array of scintillation crystals SC1, SC2, SC3, etc. of the respective radiation channels. If it is assumed that the minimum dimension for which a gun can be discriminated from other objects of similar radiation transmission characteristics corresponds to three adjacent radiation channels, then the output signals from the gun threshold detectors of three adjacent radiation channels, i.e., 1, 2, 3 are applied to an AND gate A1 which in turn will transmit an actuation signal through OR gate OR2 to alarm circuit AL2 only when the discriminating circuits DC associated with the first three radiation channels provide coincidentally input signals to AND gate A1 which are indicative of the presence of a gun. In a like manner, the outputs from the gun threshold circuits of radiation detection channels 2, 3, and 4 are connected to AND gate A2, radiation detection channels 3, 4, and 5 are connected to AND gate A3, and so on. This satisfies the orientation of the gun as illustrated in FIGS. 9B and 9C but does not satisfy the orientation depicted in FIG. 9D. Inasmuch as the passage of the gun G in the orientation illustrated in FIG. 9D results in a response solely from the radiation channel corresponding to the scintillation crystal SC1, the requirement for a gun indication from three adjacent channels will not be satisfied. In order to compensate for this orientation for the gun, the output signal produced by gun threshold circuit GT of the first radiation channel is applied to integrator circuit I which integrates the signal over a period of time corresponding to the dimension of the gun anticipated for viewing by the scintillation crystal SC1 during movement of the conveyor and subsequently applies to the integrated signal to a second gun threshold circuit GT'. If the signal developed by the integrator circuit I equals or exceeds the threshold signal corresponding to the expected integrated signal for a gun in the position illustrated in FIG. 9D, the gun threshold circuit GT' transmits an activating signal through OR gate OR3 to activate alarm circuit AL1.

While the discriminating circuit DC associated with the respective radiation channels and the associated logic circuitry represented by OR gates OR1, OR2 and OR3 and AND gates A1, A2, A3, etc. provide one technique for accurately discriminating guns and bullets from other objects exhibiting similar radiation transmission characteristics, it is apparent that numerous other techniques are available for achieving the desired discrimination. For example, the output of each radiation detector in the array can be repeatedly sampled by a suitable sampling circuit at a rate which is faster than the rate of travel of the luggage. The signals resulting from the sampling operation can then be applied to a number of shift registers in order to determine the size and shape of objects that produce detection alarms.

We claim as our invention:

1. A method for monitoring an object to detect the presence of a gun or a bullet, comprising the steps of, subjecting said object to a collimated beam of radiation energy in the range of 200 to 400 keV, monitoring the radiation transmission characteristics of predetermined portions of said object, said predetermined portions corresponding in size to a gun or bullet, and generating individual signals indicative thereof, and evaluating said signals to determine if said signals correspond to the radiation transmission characteristics of a gun or bullet.

2. A method as claimed in claim 1 wherein said predetermined portions comprise discrete portions of said object aligned with said collimated beam.

3. Apparatus for monitoring an object to detect the presence of guns or bullets, comprising, a radiation energy source for subjecting said object to a collimated beam of radiation energy in a range of 200–400 keV, radiation monitoring means spaced apart from said radiation energy source and aligned with said collimated beam to monitor the radiation transmission characteristics of an object positioned therebetween and generate output signals indicative of the radiation transmission characteristics of said object, the dimensions of said radiation monitoring means being such as to enable said radiation monitoring means to generate output signals suitable for distinguishing guns or bullets from other items associated with said object.

4. Apparatus as claimed in claim 3 including circuitry for simultaneously comparing said signals generated by said radiation monitoring means with signal information representative of the radiation transmission characteristics of a gun or bullet to determine if said signals generated by said radiation monitoring means are indicative of the presence of a gun or bullet.

5. Apparatus as claimed in claim 3 wherein said radiation monitoring means including an array of a plurality of radiation detectors spaced apart from and aligned with said radiation source such that each of said radiation detectors measures the radiation energy transmitted by a predetermined portion of an object positioned between said radiation source and said array.

* * * * *